United States Patent [19]

Vine et al.

[11] Patent Number: 4,581,302

[45] Date of Patent: Apr. 8, 1986

[54] MOLTEN CARBONATE FUEL CELL MATRIX TAPE

[75] Inventors: Raymond W. Vine, Avon; Craig R. Schroll, West Hartford; Carl A. Reiser, Glastonbury, all of Conn.

[73] Assignee: United Technologies Corporation, Hartford, Conn.

[21] Appl. No.: 307,123

[22] Filed: Sep. 30, 1981

[51] Int. Cl.$^4$ ............................................. H01M 2/16
[52] U.S. Cl. ...................................... 429/12; 429/16
[58] Field of Search .................. 429/16, 46, 112, 12

[56] References Cited

U.S. PATENT DOCUMENTS

| | | | |
|---|---|---|---|
| 3,120,456 | 2/1964 | Broers | 429/46 |
| 3,268,365 | 8/1966 | McQuade et al. | 136/86 |
| 3,311,507 | 3/1967 | Dittmann et al. | 136/120 |
| 3,400,019 | 9/1968 | Le Duc | 136/120 |
| 3,458,361 | 7/1969 | Kreiselmaier | 136/120 |
| 3,505,120 | 4/1970 | Cole | 136/86 |
| 3,513,029 | 5/1970 | Giner et al. | 136/86 |
| 3,669,752 | 6/1972 | Novack et al. | 136/86 |
| 4,000,006 | 12/1976 | Trocciola et al. | 427/115 |
| 4,001,042 | 1/1977 | Trocciola et al. | 427/115 |
| 4,009,321 | 2/1977 | Baker et al. | 429/46 |
| 4,017,664 | 4/1977 | Breault | 429/44 |
| 4,079,171 | 3/1978 | Marianowski et al. | 429/46 |
| 4,173,662 | 11/1979 | Stewart, Jr. | 427/115 |
| 4,185,145 | 1/1980 | Breault | 429/34 |
| 4,216,278 | 8/1980 | Arendt et al. | 429/46 |
| 4,217,865 | 3/1982 | Trocciola et al. | 429/16 |
| 4,279,971 | 7/1981 | Arendt | 429/16 |

OTHER PUBLICATIONS

*Treatise on Materials Science and Technology*, vol. 9, Ceramic Fabrication Processes, Franklin F. Y. Wang, ed.

*Primary Examiner*—Donald L. Walton
*Attorney, Agent, or Firm*—Harry J. Gwinnell

[57] ABSTRACT

A matrix material for a molten carbonate fuel cell is described which is flexible, pliable and has rubber-like compliance at room temperature. The matrix has three components comprising fine inert particulate material, larger crack attenuating ceramic particulate material, and an organic polymeric binder. A process of assembling a molten carbonate fuel cell utilizing the compliant matrix material is also described. The compliant matrix material is inserted into a molten carbonate fuel cell stack utilizing fuel cell anodes with sufficient porosity to contain excess electrolyte. The fuel cell is heated up to a temperature sufficient to remove the polymer binder and cause a portion of the electrolyte material present in the anode to wick into the matrix to substantially fill it completely.

5 Claims, No Drawings

MOLTEN CARBONATE FUEL CELL MATRIX TAPE

DESCRIPTION

1. Technical Field

The field of art to which this invention pertains is molten carbonate fuel cells and particularly matrix components for such fuel cells.

2. Background Art

Molten carbonate fuel cells are well known in the art and are described, for example, in U.S. Pat. Nos. 4,009,321 and 4,079,171. The electrolyte in this type of cell is solid at room temperatures and is a molten liquid at operating temperatures which generally range between 500° C. and 750° C. Some well known electrolytes of this type are the alkali metal carbonate compositions such as ternary lithium-potassium-sodium carbonate compositions and binary lithium-potassium, lithium-sodium, or potassium-sodium carbonate compositions. The electrolyte is disposed within a substantially inert matrix sandwiched between an anode and a cathode electrode. In addition to having structural integrity, the matrix, in combination with the electrolyte, must provide complete separation of the fuel and oxidant gases disposed on opposite sides thereof. The electrolyte and matrix combination is often referred to as an electrolyte tile. The matrix is usually made from submicron ceramic particles which are compatible with the fuel cell environment. For example, lithium aluminate is substantially inert to the ternary and binary carbonate compositions mentioned above, and may be used as the matrix material in cells incorporating those types of electrolytes.

Typically, such tiles are produced by compression molding the inert material in admixture with the alkali metal carbonates. This method of producing the matrix structure suffers from many disadvantages. Compression molding is a relatively expensive forming method requiring relatively large amounts of time, energy and capital investment. The resultant molded tile is a relatively thick, fragile ceramic sheet. Accordingly, it is subject to cracking, and great care must be taken in the design of the fuel cell to provide a flat surface for such sheet to insure minimal flexural and compressive forces on the tile until heated above its melt point.

The poor handleability and critical tolerance requirements dictated by the use of this type of a matrix structure make scale-up to commercial sizes and quantities unattractive. In addition, a life-limiting, functional problem exists with the compression molded tiles of this type. As the cell runs, electrolyte is consumed by corrosive reactions, vaporization, and surface migration. In a typical tile cell, the electrolyte is withdrawn from the larger pores of the matrix. The lithium aluminate cannot be sufficiently close-packed in a tile to achieve a small, uniform pore size at operating temperature by compression molding. Therefore, electrolyte withdrawn from the tile results in contraction of the two-phase structure (matrix and electrolyte), subsequently resulting in the formation of gas pockets which contribute to gas crossover and high internal resistance.

Accordingly, what is needed in this art is a matrix material which is not critically fragile, can withstand flexural and compressive forces during molten carbonate fuel cell assembly, and use, and can achieve a satisfactory inert particle distribution.

DISCLOSURE OF INVENTION

The present invention is directed to a matrix material for a molten carbonate fuel cell which is thin, flexible, pliable and compliant at room temperature. The matrix comprises a cast mixture of small particles inert to molten carbonate electrolyte, larger inert ceramic particles and an organic polymer binder. The matrix structure has a closely packed particulate network having a uniform (preferably submicron) pore distribution.

Another aspect of the invention comprises a method of assembling a molten carbonate fuel cell utilizing the compliant matrix material. The matrix material is inserted into the fuel cell stack provided with an anode of sufficient porosity to contain adequate electrolyte for continuous operation of a molten carbonate fuel cell for at least 40,000 hours. The fuel cell stack containing such anode and matrix is heated to a temperature for a time sufficient to remove the polymer binder from the matrix and cause electrolyte material to wick into the matrix from the anode.

The foregoing, and other features and advantages of the present invention, will become more apparent from the following description.

BEST MODE FOR CARRYING OUT THE INVENTION

There are preferably three components in the tapes produced according to the present invention. The first component is an inert particle preferably less than about 1 micron in size. This produces a fine pore size (e.g. about 0.15 to about 0.3 micron average pore size) in the ultimate matrix to insure electrolyte retention. $\gamma$ lithium aluminate is the preferred inert material, however, other material inert to the molten carbonate environment such as ceria, strontium titanate, strontium zirconate, etc. may be used.

The second component of the tape according to the present invention is corrosion resistant ceramic particulate material having an average size range greater than about 25 microns and preferably greater than about 50 microns in diameter. The function of this component is primarily crack attenuation. It can be made of the same material as the inert particles above, or a more reactive material such as alumina which, because of the larger particle size has less surface area and, therefore, less reactivity toward the molten carbonate electrolyte. This allows use of ceramic materials not generally considered compatible with a molten carbonate system. Note commonly assigned U.S. patent application Ser. No. 158,019, filed June 9, 1980, now U.S. Pat. No. 4,322,482 the disclosure of which is incorporated by reference.

The third component is the temporary plastic binder. This binder provides handleability, flexibility and conformability to the tape, three key structural properties. While any polymer which decomposes at temperatures lower than the molten carbonate fuel cell operating temperatures can be used, polyvinyl butyral (Monsanto Butvar B-98) is preferred. Various plasticizers and other modifiers such as flow control agents can be added to the polymer for application purposes.

The components are mixed together with an organic solvent and applied to a mold surface treated with a release agent. After drying, the thus formed tape is removed and is ready for assembly into the molten carbonate fuel cell. The amounts of the materials may vary, but are preferably used in a range of about 40% to about 45% by volume of the inert submicron particles, about 5% to about 30% and preferably about 15% by volume of the larger, crack attenuating ceramic particles with the balance being the plastic binder material. The materials are preferably mixed in a ball mill with organic solvents such as chlorinated hydrocarbons and alcohol.

The main characteristics of the matrix tape according to the present invention as compared with the prior matrices are its pliability and compliance which, when placed between the electrodes in a molten carbonate fuel cell, allow it to conform to the irregularities of such surfaces producing more intimate contact, thus eliminating spaces that might otherwise interfere with the required ion transfer.

After the matrix tape is produced, electrolyte is preloaded into the anode, which has sufficient pore volume to enable it to contain enough electrolyte for the life of the cell (e.g. 40,000 hours) including enough electrolyte to fill the matrix. Such anodes are generally produced to contain about 50% to about 70% by volume porosity (preferably about 50% to about 55%) with about 30% to about 95% of that porosity electrolyte filled (preferably about 95%). The cell is heated up gradually to decompose and strip the plastic binder prior to electrolyte melting, allowing the electrolyte to wick out of the anode and into the matrix. Cell seals and cathodes may also be provided with electrolyte from this same anode source.

Chlorinated hydrocarbons and alcohols have been found to be the preferred organic solvents for proper drying and flow control of the matrix tape material during forming. Alcohols such as ethanol and butanol mixed with chlorinated hydrocarbons such as perchloroethylene and an anti-foaming agent have been found to provide viscosity and flow properties of the matrix material for easy application.

The coatings can be applied to the mold surface by any method such as brushing, spraying, etc. although use of conventional curtain coating and doctor-blade casting is preferred. Note "Doctor-Blade Process" by J. C. Williams which teaches a method of formulating electronic ceramic tapes through the use of a doctor-blade process (*Treatise On Materials Science and Technology*, Vol. 9, Ceramic Fabrication Processes, Franklin F. Y. Wang ed.).

In the casting operation, a glass mold surface is preferred, and while a variety of mold release agents such as Teflon ® (duPont de Nemours & Co., Inc.) and beeswax have been used, beeswax has been found to be easy to apply and long-lasting during a plurality of casting applications. The beeswax can be applied in solution in perchloroethylene with a clean cloth. Master Sheet Wax (The Kindt-Collins Co., Cleveland, Ohio) has been found to be particularly suitable for this purpose. It is particularly desirable to apply several layers of the matrix composite with drying (preferably air drying) between each application before removal from the mold surface.

Chlorinated hydrocarbons and alcohols have been found to be the preferred organic solvents for proper drying and flow control of the matrix tape material during casting. Alcohols such as ethanol and butanol mixed with chlorinated hydrocarbons such as perchloroethylene have been found to provide suitable flow properties to the slurry. A slurry viscosity in the range of 800–1200 cps is preferred for casting layers, either by doctor-blade or curtain coater. Other materials are added to aid mixing, casting, and final tape properties. A deflocculant such as crude menhaden fish-oil aids in dispersing the ceramic particles. An anti-foaming agent like Dow Anti-foam A aids in the escape of trapped gas bubbles during drying. Plasticizers like Monsanto Santicizer #8 prevent embrittlement of the dried tape. The fish-oil also contributes to flexibility.

Entrapment of gas bubbles in the tape requires their removal before drying. To aid this, drying may be retarded by use of solvents with lower vapor pressure, like butanol, or more effectively, by holding the freshly cast tape in an atmosphere saturated with solvent vapors. Typically, a 15 minute delay before drying will allow bubbles to escape. The use of an anti-foam agent aids the breaking and release of the bubbles. If the solvent vapor treatment is utilized to remove entrapped gas bubbles before drying, any of the above-cited chlorinated hydrocarbon or alcohol solvents can be used, although the use of an azeotropic mixture of perchloroethylene and ethanol is preferred. Treatment time should be sufficient to remove the bubbles; in most instances, times of at least 5 minutes being required.

EXAMPLE 788 grams of perchloroethylene, 260 grams of secondary isobutanol, and 36 grams of Dow-Corning Antifoam-A were mixed together with 1200 grams of calcined (4 hours at 1300° F., 704° C.) jet-milled $\gamma$ LiAlO$_2$, and ball-milled with alumina balls for 24 hours to thoroughly disperse the LiAlO$_2$. 150 grams of Monsanto Santicizer #8 (N-ethylortho and para-toluenesulfonamide), 750 grams of denaturedethanol, and 275 grams of Monsanto Butvar B-98 (polyvinyl butyral) were then added, and ball milling was continued for 48 hours. The alumina milling balls were then removed, and 60 grams of crude menhaden fish-oil and 632 grams of 120 grit Alundum-38 (Al$_2$O$_3$) were added. Everything was then rolled without balls in the ball-mill to mix the ingredients without further grinding. The mill was then rotated slowly enough (1 to 2 rpm) to allow the escape of most trapped air bubbles without allowing the alumina to settle out. This solution was applied with a doctor-blade to glass sheets treated with a beeswax mold release agent. Coatings 9–12 mils thick were applied and allowed to air dry for 5–15 minutes to a thickness of about 5 to 6 mils. This process was repeated until coatings 12–25 mils thick were obtained. The final dried tape was easily removable from the mold surface and had a compliant consistency. When measured on a Shore A Durometer a reading of 94 was typically seen. A ten-cell molten carbonate fuel cell stack of one square foot sheets was next assembled by placing matrix tapes between porous nickel anodes prefilled with electrolyte to approximately 95% of their porosity, and porous nickel cathodes (nickel oxide has also been used), with separator plates between cells and heating according to the following schedule. It should be noted that while this example is described in terms of a ten-cell stack electrode-matrix assembly, an entire fuel cell stack can consist of approximately 500 of such electrode matrix assemblies which can be heat treated according to this process. The ten-cell stack of the above described cells was heated from room temperature up to 205° C. in an air environment with a temperature increase of 40° C. per hour. Once a temperature of 205° C. was attained, the stack was held there for 6 hours. The temperature of the stack was next raised to 315° C. in increments of 40° C. per hour and held there for 6 hours. This removes all solvent from the tape and volatilization of the polymer begins. The temperature of the stack was next raised again at 40° C. per hour to 470° C. and held there for 2 hours. Complete pyrolization and volatilization of the polymer now occurs. Following this, reducing gas was introduced into the stack anode compartments and the temperature raised above the melt point of the electrolyte (about 490° C.) at the rate of 40° C. per hour until a stack operating temperature of approximately 650° C. was reached.

While the invention has primarily been described in terms of particular inert particles, ceramic particles, polymer binders, solvents and release agents, it would, of course, be within the purview of one skilled in this art to use any materials which are compatible with molten carbonate at fuel cell operating conditions.

Although this invention has been described with respect to detailed embodiments thereof, it will be understood by those skilled in the art that various changes in form and detail thereof may be made without departing from the spirit and scope of the claimed invention.

We claim:

1. A matrix material for a molten carbonate fuel cell comprising particles inert to molten carbonate electrolyte having a particle size less than about 1 micron, ceramic particles having a particle size greater than about 25 microns, and an organic polymeric binder material, the binder material being present in an amount at least about 35% by volume, the matrix material being flexible, pliable, and compliant at room temperature.

2. The matrix of claim 1 wherein the inert particles are present in about 40% to about 45% by volume and the ceramic particles are present in an amount at least about 15% by volume.

3. The matrix of claim 1 wherein the polymer is polyvinyl butyral.

4. The matrix of claim 1 wherein the inert material is lithium aluminate.

5. The matrix of claim 1 wherein the ceramic particles are alumina.

* * * * *